United States Patent

Bergeron et al.

[11] Patent Number: 6,038,808
[45] Date of Patent: Mar. 21, 2000

[54] HOOK REMOVER

[76] Inventors: Stevie J. Bergeron; Carey L. Bergeron, both of 323 Hawthorne Dr., Houma, La. 70360

[21] Appl. No.: 09/204,316

[22] Filed: Dec. 3, 1998

Related U.S. Application Data

[66] Substitute for application No. 08/832,111, Apr. 3, 1997, abandoned.

[51] Int. Cl.[7] .................................................. A01K 97/00
[52] U.S. Cl. ............................................ 43/53.5; 177/245
[58] Field of Search ......................... 43/53.5, 4; 33/85, 33/511; 7/106, 164; 177/129, 232, 245; D22/118

[56] References Cited

U.S. PATENT DOCUMENTS

| | | |
|---|---|---|
| 95,964 | 10/1869 | Zerbe . |
| 318,920 | 5/1885 | Lytle . |
| 1,255,269 | 2/1918 | Zinkiewiez . |
| 1,322,826 | 11/1919 | Ryerson . |
| 2,003,893 | 6/1935 | La Pan . |
| 2,348,662 | 5/1944 | Stevens ........................................ 43/30 |
| 2,578,289 | 12/1951 | Danielson . |
| 2,630,314 | 3/1953 | Cadwallader .............................. 265/63 |
| 2,690,927 | 10/1954 | Bean . |
| 2,750,184 | 6/1956 | Warndahl . |
| 2,795,887 | 6/1957 | Lockert . |
| 2,805,850 | 9/1957 | Robinson . |
| 2,816,750 | 12/1957 | Martin . |
| 2,967,373 | 1/1961 | Garrison . |
| 3,115,722 | 12/1963 | Mann ........................................ 43/21.2 |
| 3,434,231 | 3/1969 | King .......................................... 43/53.5 |
| 4,643,267 | 2/1987 | Southern . |

*Primary Examiner*—Kurt Rowan
*Attorney, Agent, or Firm*—Patent & Trademark Services; Thomas Zack; Joseph H. McGlynn

[57] ABSTRACT

A fishing hook removing tool having a hollow outer casing with an outer length measurement scale and an inner movable scale. Length measurements on the inner scale, when extended from the outer casing, are additive to those on the outer casing. This allows the length measurement of fish greater than the total length of the outer casing measurement scale. The rear end of the outer casing has a V shaped hook remover with one side of the V being greater than the other. In addition, the inner scale may have weight measurement units on one side and a compression spring within the outer casing to permit the weighing of a fish.

2 Claims, 2 Drawing Sheets

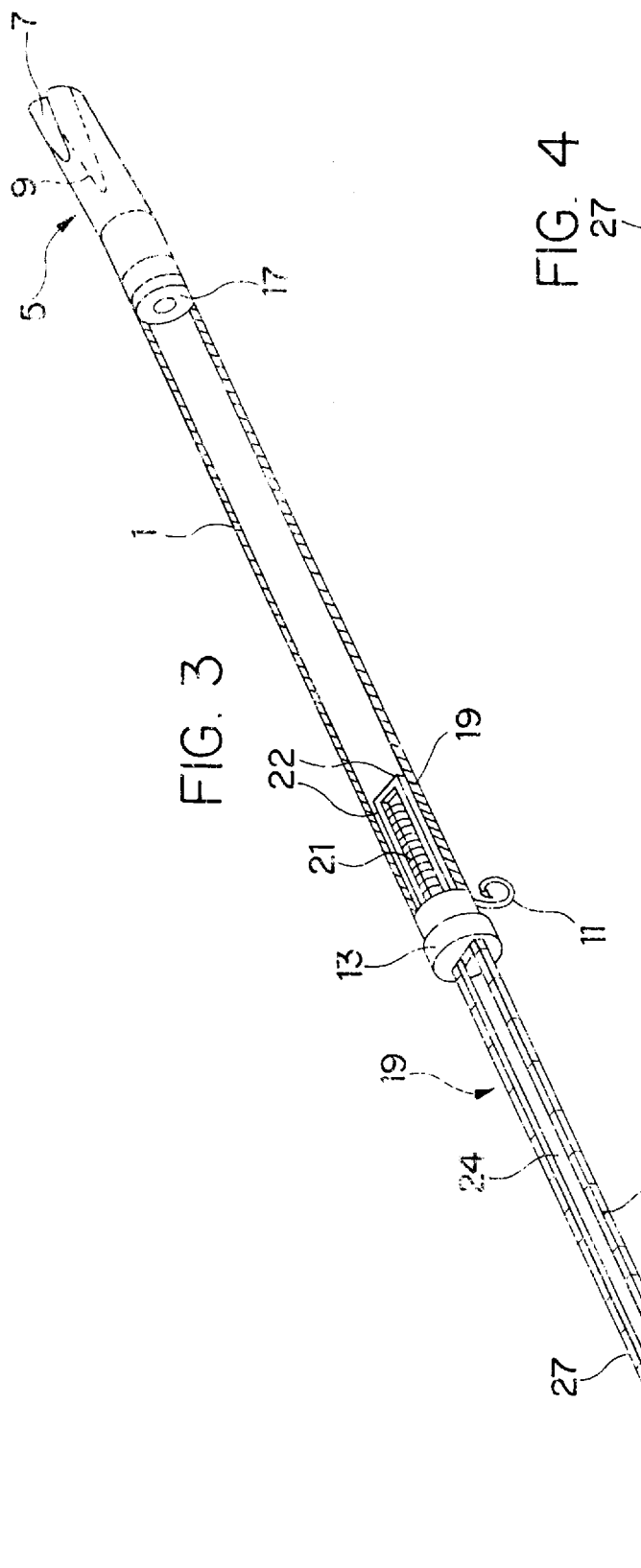
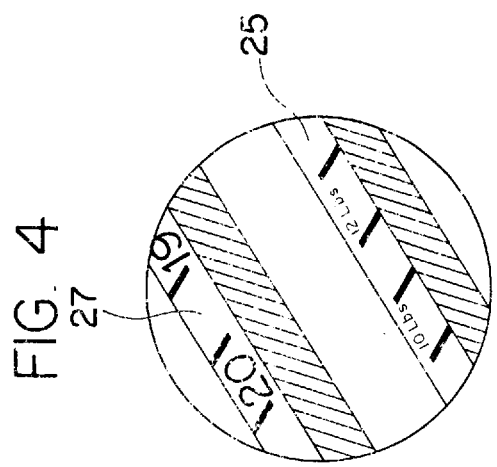

HOOK REMOVER

This is a substitute application for Ser. No. 08/832,111, filed Apr. 3, 1997, now abandoned.

BACKGROUND OF THE INVENTION

A fishing hook swallowed by fish may need to be removed from the fish for a variety of reasons. One reason may be to simply retrieve the hook from the caught fish and then store it. Another reason may be to measure the fish and, if below a predetermined size or weight level, set by law, release the fish back into the water. In either event, hook removers or extractors have been developed to perform this function to prevent injury by the hook ends to the user's fingers. Some hook removers consist of an elongated straight bar with one or more hook holding members at their ends. Others may incorporate a scale to weigh the fish and/or a measuring scale to measure its length.

The present invention provides for a hook remover mounted on a measuring scale used to measure the length of the fish, and in which an outer scale can be extended beyond its normal length by pulling on an inner measuring scale located within it as described herein.

DESCRIPTION OF THE PRIOR ART

Fish hook removers are known in the prior art. For example, U.S. Pat. No. 2,348,662 to Stevens discloses a straight bar hook extractor having a hook engaging member on one of its ends with a smooth fish line engaging member on the other end.

U.S. Pat. No. 2,630,314 to Cadwallader combines a fishing knife with a gaff hook, a fish scaler and a weighing scale.

U.S. Pat. No. 3,115,722 to Mann discloses a multipurpose fishing tool having a fishing pole ground stake, a hook remover, a length measuring scale and means to clip the tool to a fishing rod.

U.S. Pat. No. 3,434,231 to King discloses a fishing tool having a ruler, scaler, hook remover and a plug and fly remover.

The present invention differs from the known prior art by providing for a fish hook removing tool which can weight and measure a caught fish wherein the length of an outer measuring scale can be extended by an inner measuring scale as further described in this specification.

SUMMARY OF THE INVENTION

This invention relates to a fishing hook remover tool having an outer length measuring scale whose length measuring can be extended by an inner length measuring scale. The inner scale has an end unit that can also be used to hold a fish and means to weigh the held fish.

It is the primary object of the present invention to provide for an improved tool that can remove a fish hook and measure the length of the caught fish.

Another object is to provide for such a tool that can also weigh the caught fish.

These and other objects and advantages of the present invention will become apparent to readers from a consideration of the ensuing description and the accompanying drawings.

BRIEF DESCRIPTION OF THE DRAWINGS

FIG. 3 shows a perspective view of FIG. 1 with the inner length and weight measuring scale extended and most of its upper outer section removed.

FIG. 4 shows an enlarged view of a section of the two scales used on the FIG. 3 extended inner scale.

DESCRIPTION OF THE PREFERRED EMBODIMENT

Figure 1:
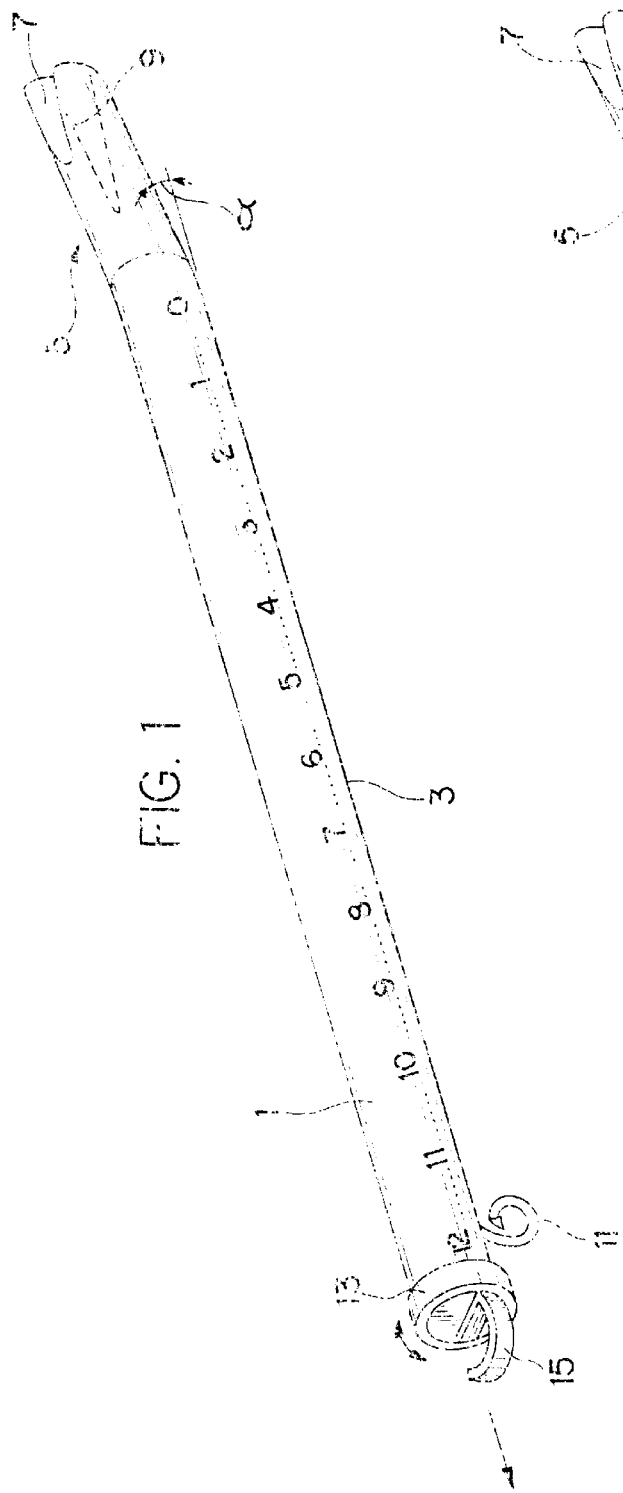
FIG. 1 is a perspective view of the invention's preferred embodiment.

FIG. 1 is a perspective view of the invention's preferred embodiment. The elongated straight cylindrical plastic hollow rod casing 1 has a measuring length scale along its outer surface, which is measured in inches and can be used to measure the length of a caught fish. At the rod's rear end is a removably attached nosepiece hook remover 5. This remover has a "V" shaped opened cut out 7 cut into the center of the remover with a longer "V" shaped cut out portion 9 on its underneath side, as shown in dotted lines in FIG. 1.

The remover 5 is angled about 15 degrees upwardly from an extended side of the straight rod's casing side. This angular variant is shown as the angle $\alpha$ in FIG. 1 and assists the nosepiece remover in the removal of a fishhook from the intestines of a caught fish. Located on the underside of the rod casing 1 is a depending eye hook 11 for holding the fishing line and assisting in the removal of the fish hook.

A screw on internally threaded front cap 13 acts to retain a internal compression spring housed within the hollow rod casing 1. The cap has inner threads which engage outer threads on the rod's front, outer surface. Extending from the same front end is the weight holding measuring hook 15 which is part of an inner measuring scale used to retain the spring as explained hereafter. By pulling on the hook 15, either by the weight of a fish or by hand, an inner measuring scale concealed within the hollow of rod casing 1 is visually displayed indicating the weight (or amount of force used in pulling) on the fish hook. As further explained hereafter this inner scale also has measurement indicators along one of its sides to permit the measurement of fish exceeding the length imprinted or posted on the scale 3 outside of the rod. For example, if 12 inches is the maximum shown length that the outer length measuring scale indicates, as shown, then measurements over 12 inches could be made by pulling out, in the direction of the arrow, the inner scale attached to the hook 15.

Figure 2:
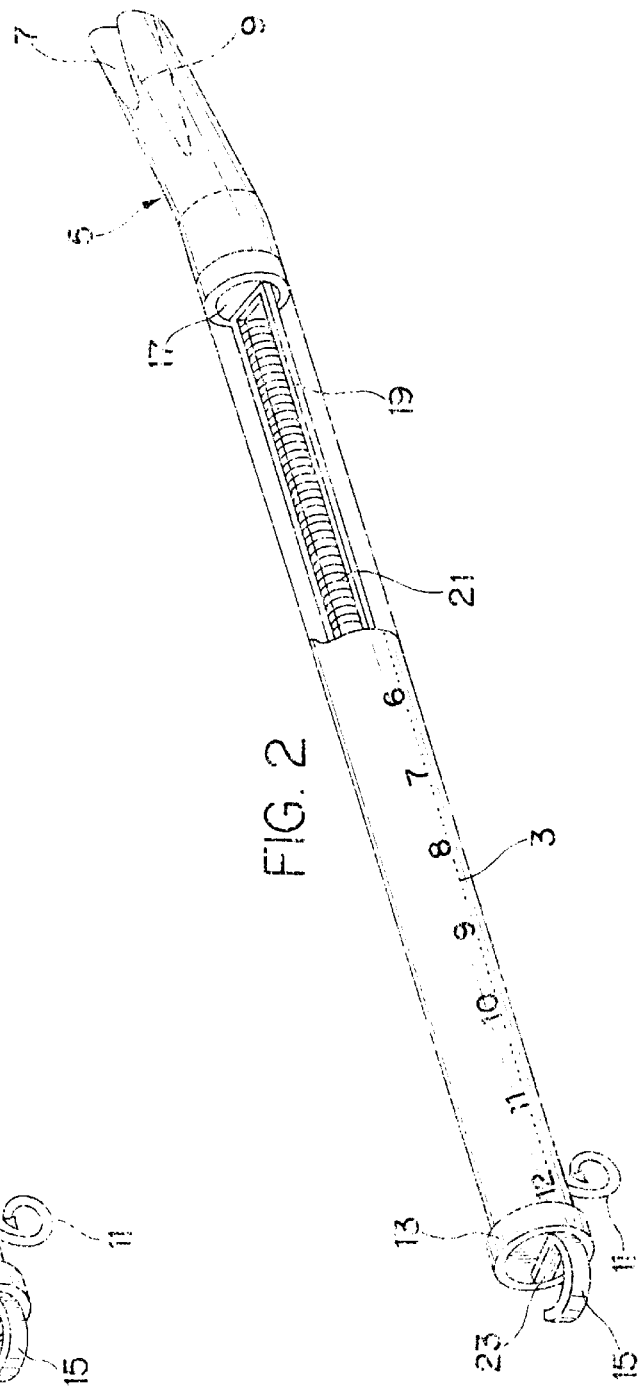
FIG. 2 is a the same view as in FIG. 1 with part of the rear outer section cut away to show its inner components.

FIG. 2 is the same view as in FIG. 1 with the upper part of the rear, outer rod section cut away to show its inner workings. The circular stop plate 17 is located near the end of the dual function inner measuring scale 19. Inner measuring scale 19 is a flat elongated ruler member whose front end is the exposed hook 15 which extends through a rectangular slot 23 in the screw-on retaining cap 13.

The center portion 24 of inner scale 19 may be left opened to form a rectangular cut out to mount the compression coil spring 21 and reduce the scale's weight. The outer diameter of coil spring 21 is greater than the height of slot 23 to prevent it from passing through when compressed against the cap. When end hook 15 is moved to the left, the inner scale 19 moves with it, but the seated spring 21 is compressed by it and retained by the cap 13 in the process. Appropriate extending side stops 22 on the two sides of scale 19 prevent it from passing completely through the slot 23 when fully extended. Lower eye hook 11, used to guide and retain a stretched fishing line extending from the hook to the user's reel (not shown), is rigidly attached to the underside of the hollow rod casing 1.

FIG. 3 shows a perspective view of FIG. 1 with its inner length and weight measuring scale 19 extended, and most of the upper part of the rod's outer casing 1 removed. In the extended position the stop 17 stays at the back while the inner scale 19 and its seated spring 21 is compressed between it and the front retaining cap 13. The extended part of inner scale 19, outside of the rod casing 1, has two opposite side scales 25 and 27 stamped along its length. Scale 25 represents the weight markings in pounds (LBS) of a fish hung from the end hook 15 under the pull of gravity.

The other scale 27 has extended length markings starting from the highest markings of the outer scale 3 (e.g., 12 inches) and ending at the highest exposed length of the inner scale such as 24 inches. Thus, fish in length up to 24 inches, or a higher amount depending on the length of casing 1, can be measured by the scale markings 3 on the outer casing or, if a greater length than those on the outer scale markings 3, by the extended inner scale markings 27.

FIG. 4 shows an enlarged view of a portion of the two opposite side scale markings used on the FIG. 3 extended inner scale element 19. Clearly, the specific units used to measure a fish's length and weight could by design choice be different or a combination of different values such as inches/centimeters or pounds/grams.

In one embodiment the hollow rod casing 1 was made of an injection molded ABS (Acrylonitrile-butadiene-styrene) plastic material approximately 15 inches in overall length with a diameter of ⅜ of an inch. The outer length scale 3 is 12 inches. The hook remover 5 is about 3 inches in length with a 15 degree angled "V" shaped cut out 7. The inner scale 19 is made of a flat stainless steel bar with a center opening and with stamped scale markings on its two opposite side edges for the scales 25 and 27.

In use, a user would hold the casing 1 in one hand, with the fish in the other hand while keeping tension on the fishing line 29, shown in dotted lines in FIG. 3. Next, the user would insert the front opened V shaped notch 7 inside the fish's mouth to engage the hook end and push downwardly to remove the hook. Once the hook is removed from the fish, the fish may be measured on scale 3 or, if larger than its scale allows, by the extended inner scale 27. To weigh the fish it is hung by the hook 15 through its side gill and mouth to compress the spring 21 while the casing 1 is maintained in a generally vertically disposed orientation. A reading on the inner scale exposed marking 25 indicates the fish's weight in the units marked.

The primary components of the fish hooker remover tool, including the rod casing 1, the screw on cap 13 and the outer casing numbers, would best be manufactured of ABS plastic using the injection molding process. Injection molding is a plastic molding process whereby heat softened plastic material is forced under very high pressure into a metal cavity mold, usually aluminum or steel, which is relatively cool. The inside cavity of the mold is comprised of two or more halves, and is the same desired shape as the product to be formed (in this case the hollow casing, its front retaining cap and casing scale markings). High pressure hydraulics are used to keep the mold components together during the actual injection phase of the molding process. The injected plastic is allowed to cool and harden in the mold. The hydraulics holding the multiple component mold cavity together are released, the mold halves are separated and the solid formed plastic item is removed. Injection molding can be highly automated process and is capable of producing extremely detailed parts at a very cost effective price. The process should be invaluable in producing this invention's fish hook remover tool cost effectively.

The flat, stainless steel inner scale 19 can be manufactured using the metal stamping and punching processes including the numbers stamped on its two side scales. Metal stamping is a process whereby flat metal is formed between two parts of a die under tremendous pressure. The metal can be punched, formed and shaped in these dies, many times in one process, and spot welding of separate components can be employed to complete the assembly of sheet metal components. The stamped metal used for the inner scale may be stainless steel or plated carbon steel to prevent rusting.

The weight measuring compression spring 21 is an "off the shelf" commercially available component. The Thomas Register of American Manufacturers is a good resource for locating manufacturers and supplies of such commercially available components.

The spring is assembled by first placing the spring inside the stamped stainless steel inner scale 19 which is inside the hollow casing 1. Next, the retaining cap 13 is screwed on the casing's front end with its front hook 15 exposed. The rear hook 5 can be mounted on the other end of the casing 1 by external casing threads that engage internal hook end threads.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What we claim as our invention is:

1. A fishing hook remover comprising:
   an elongated hollow outer casing having a longitudinal axis, and a front end and a rear end and an outer scale with length measurements units thereon,
   an elongated flat bar inner scale mounted in said outer casing,
   said inner scale being movable within said outer casing in the direction of the outer casing's length, and capable of extending from the casing's front end,
   said inner scale having units representing additive length measurements to those on the outer casing measurements,
   said inner scale having a weight indicating scale to indicate the weight of a fish hung on the inner scale when the outer casing is in a vertically disposed position,
   biasing means associated with said inner scale and mounted within said outer casing to bias the inner scale towards the outer casing's rear end,
   means for preventing said inner scale from being completely removed from said outer casing, and
   a fishing hook remover with an opened V-shaped notch mounted on the rear end of said outer casing and adapted to remove fishing hooks from a fish.

2. The invention as claimed in claim 1, wherein said fishing hook remover's V-shaped notch is larger on one side than on another side,
   said fishing hook remover being angled slightly upwardly with respect to the longitudinal axis of the elongated casing.

* * * * *